United States Patent
Malhotra

(12) 
(10) Patent No.: US 6,834,232 B1
(45) Date of Patent: Dec. 21, 2004

(54) DUAL DISIMILAR SENSING OBJECT DETECTION AND TARGETING SYSTEM

(75) Inventor: Anita B. Malhotra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/604,547

(22) Filed: Jul. 30, 2003

(51) Int. Cl.[7] .............................. G06G 7/78; G06F 17/00
(52) U.S. Cl. ........................ 701/301; 342/70; 340/903
(58) Field of Search ................................ 701/300–302; 340/901, 903, 425.5, 435, 436; 342/69–72

(56) References Cited

U.S. PATENT DOCUMENTS

| | | | |
|---|---|---|---|
| 5,386,285 A | | 1/1995 | Asayama |
| 5,479,173 A | | 12/1995 | Yoshioka et al. |
| 5,587,929 A | * | 12/1996 | League et al. ............... 342/159 |
| 5,617,085 A | | 4/1997 | Tsutsumi et al. |
| 5,805,103 A | | 9/1998 | Doi et al. |
| 6,134,497 A | | 10/2000 | Hayashi et al. |
| 6,191,704 B1 | | 2/2001 | Takenaga et al. |
| 6,292,752 B1 | | 9/2001 | Franke et al. |
| 2002/0005778 A1 | | 1/2002 | Breed et al. |
| 2002/0044048 A1 | | 4/2002 | Watanabe et al. |
| 2002/0057195 A1 | | 5/2002 | Yamamura |

\* cited by examiner

*Primary Examiner*—Yonel Beaulieu
(74) *Attorney, Agent, or Firm*—Frank A. MacKenzie

(57) ABSTRACT

A method of performing object detection within a collision warning and countermeasure system (10) is provided. The method includes generating an object detection signal and generating an image detection signal. Centers-of-reflection (56) and centers-of-intensity (59) are determined in response to the object detection signal and the image detection signal. The centers-of-intensity (59) are associated with the center-of-reflection (56). Differences between the centers-of-reflection (56) and the centroids (62) are determined for a plurality of frames (65) and a sensor difference signal is generated. An object (36) is classified in response to the sensor difference signal.

20 Claims, 5 Drawing Sheets

DUAL DISIMILAR SENSING OBJECT DETECTION AND TARGETING SYSTEM

BACKGROUND OF INVENTION

The present invention relates to collision warning and countermeasure systems for an automotive vehicle, and more particularly to a system and method of performing object detection and association using multiple similar and dissimilar sensors.

Collision warning and countermeasure systems are becoming more widely used. Collision warning systems preferably are able to detect an object approximately 50 m–100 m from a host vehicle and assess whether the object detected is an obstacle and poses a threat to the host vehicle. These systems also preferably provide a vehicle operator knowledge and awareness of obstacles or vehicles within a close proximity in time such that the operator may perform actions to prevent colliding with the detected obstacles. Countermeasure systems exist in various passive and active forms. Some countermeasure systems are used to aid in prevention of a collision others are used to aid in the prevention of injury to a vehicle operator.

Certain collision warning systems and countermeasure systems are able to sense a vehicle or object in a close proximity to a host vehicle and warn a host vehicle operator, such that the operator can take precautionary steps to prevent a collision or injury. The collision warning systems maybe forward or rearward sensing. These systems indicate to a vehicle operator that an object, that may not be visible to the vehicle operator, is within a stated distance and location relative to the host vehicle. The vehicle operator may than respond accordingly. Other collision warning systems and countermeasure systems activate passive countermeasures such as air bags, load limiting seat belts, or active vehicle control including steering control, accelerator control, or brake control whereby the system itself aids in preventing a collision or injury.

Separate from collision warning systems and countermeasure systems other systems exist for autonomously controlling a vehicle. These systems may include sensors, such as cameras, radar sensors, or ultrasonic sensors to gather information and utilize this information when activating steering control, brake control, and accelerator control. Autonomous type systems have primarily been used for military applications but have not been used for either providing collision warning or injury prevention in automotive vehicles.

In threat estimation, detection, and identification of an object in a host vehicle's path, multiple sensors of various types have been used. The sensors have been used to detect an object followed by use of parametric association/estimation techniques to confirm when an object is a potential threat to the host vehicle and to host vehicle occupants. The object of concern may be a real object or a false object. False objects may be detected for example, when there is a stationary roadside object that is foreseen as a true potentially collision causing object or when a small object, that is not a potential threat, is in the path of the host vehicle and is identified and misclassified as a potentially collision-causing object. Another example of false object generation is when a ghost object is falsely generated by the collision warning and countermeasure system that in actuality does not exist, as known in the art.

The collision warning and countermeasure systems collect data from multiple sensors and associate, fuse, or combine the data to determine whether detected objects are real objects rather than false objects. Advantages of utilizing data from multiple sensors includes extended spatial and temporal coverage, increased accuracy in determining whether an object is a potential threat, and increased reliability in detection of objects in a close proximity of the host vehicle, thereby, providing a better assessment of the vehicle's surroundings.

Choice of architecture for processing object information, being cost effective, and being able to provide relevant information quick enough so that appropriate action can be performed is critical in determining whether a particular technology is feasible for use. There is a current desire to use cameras in detecting and classifying objects. Unfortunately, current camera technology is not cost effective and requires a large amount of processing power and time to compute relevant information required for in-vehicle use. For example, image processing from a charge coupled device (CCD) camera is time consuming due to a large amount of data collected for each image, approximately 640×480 pixels per frame at 30 frames per second. Time is critical in prevention of a collision. To accurately classify and track an object can require acquisition of tens to hundreds of frames of data each of which having a minimum desired resolution, thus, rendering current camera technology for in-vehicle use infeasible.

A desire exists to provide a safer automotive vehicle with increased collision warning and safety countermeasure intelligence as to decrease the probability of a collision or of an injury. It is therefore desirable to provide an improved collision warning and safety countermeasure system for an automotive vehicle that incorporates use of multiple sensor technologies and provides a more efficient collision and injury prevention system for an automotive vehicle.

SUMMARY OF INVENTION

The present invention provides a system and method of detecting objects within close proximity of an automotive vehicle using both object detection and image generation technologies such as electro-magnetics and electro-optical technologies, respectively. A method of performing object detection within a collision warning and countermeasure system is provided. The method includes capturing & generating an object detection signal and generating an image detection signal. Centers-of-reflection and centers-of-intensity are determined in response to the object detection signal and the image detection signal. The centers-of-intensity are associated with the centers-of-reflection for a plurality of frames. Differences between the centers-of-reflection and the centers-of-intensity are determined for each frame and a sensor difference signal is generated. An object is classified in response to the sensor difference signal.

One of several advantages of the present invention is that it provides a collision warning and countermeasure system that minimizes image processing time, processor requirements, memory requirements, & complexity, thus providing a cost effective and feasible solution for in-vehicle use of existing camera technology.

Another advantage of the present invention is that it provides a method of associating data collected from both electro-magnetic and electro-optical sensors, such as radar sensors and cameras, as to better and more efficiently classify and track objects.

Furthermore the present invention continuously adjusts a region-of-interest and corresponding center-of-intensity for each image frame to provide better certainty of an object and improved tracking capability.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein:

FIG. 7A is a diagram of a sample image frame illustrating updated regions-of-interest for objects becoming closer to a host vehicle in accordance with an embodiment of the present invention; and.

DETAILED DESCRIPTION

Figure 1:
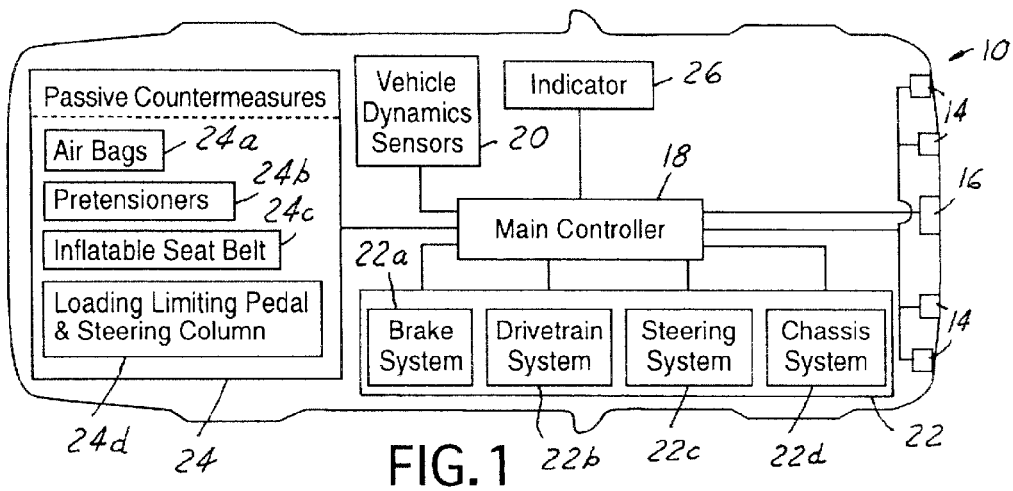
FIG. 1 is a block diagrammatic view of a collision warning and countermeasure system for an automotive vehicle in accordance with an embodiment of the present invention.

In the following figures the same reference numerals will be used to refer to the same components. While the present invention is described with respect to system and method of detecting and tracking objects within close proximity of an automotive vehicle using both electro-magnetic detection and electro-optical technologies, the present invention may be adapted and applied to various systems including: collision warning systems, collision avoidance systems, parking aid systems, reversing aid systems, countermeasure systems, vehicle systems, or other systems that may require collision avoidance or assessment.

In the following description, various operating parameters and components are described for one constructed embodiment. These specific parameters and components are included as examples and are not meant to be limiting.

Also, in the following description the term "performing " may include activating, deploying, initiating, powering, and other terms known in the art that may describe the manner in which a passive countermeasure may be operated.

Additionally, in the following description the term "countermeasure " may refer to reversible or irreversible countermeasures. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Moreover, a countermeasure signal may include information pertaining to the above stated reversible and irreversible countermeasures or may include other information, such as collision warning information. For example, the countermeasure signal may contain object detection information, which may be used to indicate to a vehicle operator the presence or close proximity of a detected object.

Referring now to FIG. 1, a block diagrammatic view of a collision warning and countermeasure system 10 for an automotive vehicle or host vehicle 12 in accordance with an embodiment of the present invention is shown. The system 10 includes electro-magnetic sensors 14 and at least one electro-optical sensor 16, which are electrically coupled to a main controller 18. The controller 18 combines information received from the electro-magnetic sensors 14 and the electro-optical sensor 16 to detect and associate objects from multiple sensors for the purpose of object tracking and threat assessment within a close proximity of the vehicle 12. The system 10 may also include various vehicle dynamic sensors 20, active countermeasures 22, passive countermeasures 24, and an indicator 26, which are all electrically coupled to the controller 18. The main controller 18 may activate the countermeasures 22 and 24 or indicate to a vehicle operator various object and vehicle information, via the indicator 26, to prevent a vehicle collision and injury to vehicle occupants.

In determining sensors that are appropriate for a given application, factors such as range, range rate, shape, and size of an object are considered. In a preferred embodiment of the present invention active sensors in the form of radar are used for electro-magnetic sensors 14 and a passive sensor in the form of a camera is used for the electro-optical sensor 16 to access host vehicle 12 surroundings. Radar provides derived measurements such as range, range rate, azimuth angle, elevation, and approximate size of an object, as well as other information known in the art. A camera may provide derived measurements such as location, size, and shape of an object.

The electro-magnetic sensors 14 may be of various sensor technologies including radar, lidar, or other sensor technology forms known in the art and may be referred to as active sensors. The electro-magnetic sensors 14 generate multiple object detection signals (RCS, Frequency & time) upon detecting one or more objects of various size and shape. Although four electro-magnetic sensors are shown, any number of electro-magnetic sensors may be utilized. In the present invention, the object detection signals are utilized to compute derived measurements such as object's relative range, azimuth angle, velocity, and bearing information, as well as other object information known in the art.

The electro-optical sensor 16, although, is preferably a charge-coupled device (CCD) camera it may be of another type such as a camera using complementary metal-oxide semiconductor (CMOS) technology. The electro-optical sensor 16 may be referred to as a passive sensor. The electro-optical sensor 16 is a two-dimensional device that may have varying resolution, accuracy, field-of-view (FOV), and silicon wafer capability.

The electro-magnetic sensors 14 may be considered as primary sensors and the electro-optical sensors 16 may be considered as secondary sensors.

The main controller 18 is preferably microprocessor based such as a computer having a central processing unit, memory (RAM and/or ROM), and associated input and output buses. The main controller 18 may be a portion of a central vehicle main control unit, an interactive vehicle dynamics module, a restraints control module, a main safety controller, or may be a stand-alone controller as shown.

The vehicle dynamics sensors 20 may include a transmission rotation sensor, a wheel speed sensor, an accelerometer, an optical sensor, or other velocity or acceleration sensors known in the art. The vehicle dynamic sensors 20 are used to determine velocity and acceleration of the vehicle 12 and generate a vehicle dynamics signal.

Active countermeasures 22 may include control of a brake system 22a, a drivetrain system 22b, a steering system 22c, a chassis system 22d control, and other active countermeasures known in the art.

The passive countermeasures 24 may include passive countermeasures, such as air bags 24a, pretensioners 24b, inflatable seat belts 24c, a load limiting pedal and steering column 24d, and other passive countermeasures and control thereof as known in the art. Some possible passive countermeasures that may be included, but that are not shown are seatbelt control, knee bolster control, head restraint control, load limiting pedal control, load limiting steering control, pretensioner control, external airbag control, and pedestrian protection control. Pretensioner control may include control over pyrotechnic and motorized seatbelt pretensioners. Airbag control may include control over front, side, curtain, hood, dash, or other type airbags. Pedestrian protection control may include controlling a deployable vehicle hood, a bumper system, or other pedestrian protective devices.

Indicator 26 is used to signal or indicate a collision-warning signal or an object identification signal in response to the object detection signals. The indicator 26 may include a video system, an audio system, an LED, a light, global positioning system, a heads-up display, a headlight, a taillight, a display system, a telematic system or other indicator. The indicator 26 may supply warning signals, collision-related information, external-warning signals to objects or pedestrians located outside of the vehicle 12, or other pre and post collision information.

Figure 2A:
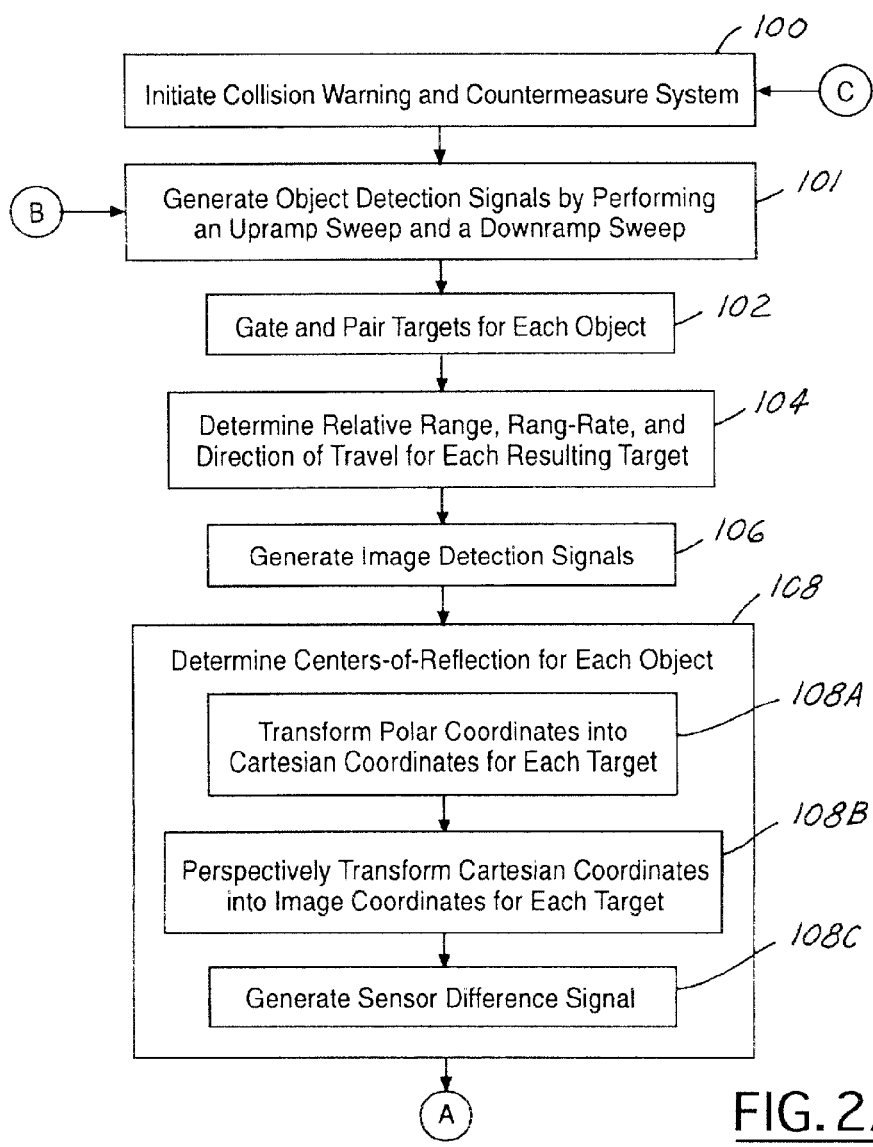
FIG. 2A is a logic flow diagram illustrating a method of performing object detection within the collision warning and countermeasure system in accordance with an embodiment of the present invention.
Figure 2B:
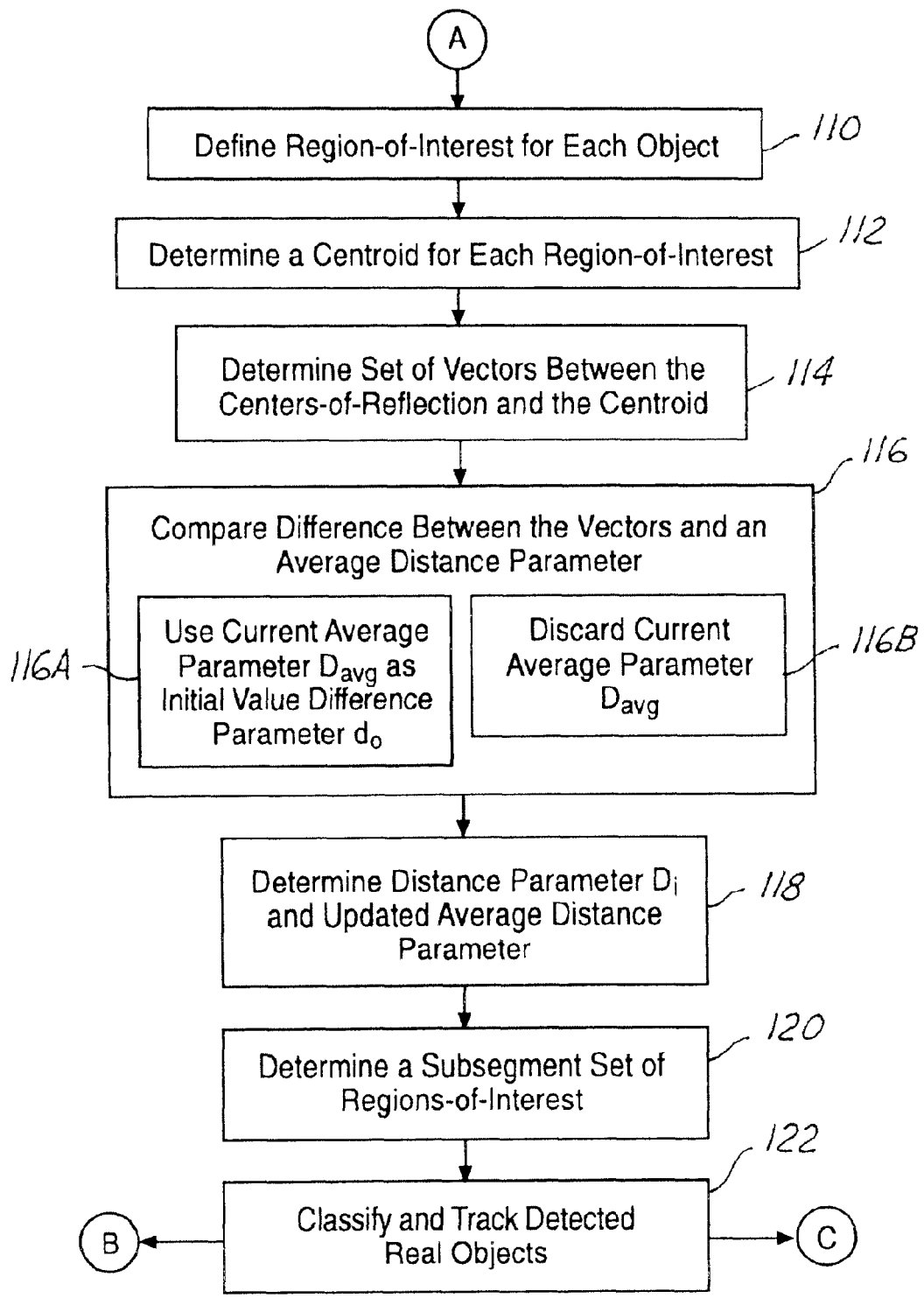
FIG. 2B is a continuation of the logic flow diagram of FIG. 2A in accordance with an embodiment of the present invention.

Referring now to FIGS. 2A–B, a logic flow diagram illustrating a method of performing object detection within the collision warning and countermeasure system 10 is shown.

In step 100, the system 10 is initialized. The controller 18 determines whether radar data is available at a frequency of approximately 2 Hz. When radar data is available the controller 18 proceeds to step 101, otherwise the controller 18 recognizes that a fault may exist and indicates an error. Also, radar frame designator j is set equal to one.

In step 101, the electro-magnetic sensors 14 may generate one or more object detection signals. The electro-magnetic sensors 14 perform upramp sweeps 30 and a downramp sweeps 32. The object detection signals contain Object designators 34 that are generated in both the upramp sweeps 30 and downramp sweeps 32 and correspond to detected objects 36 obtained by comparing a received echo signal with an originally transmitted signal to determine range and azimuth angle in each of the sweeps 30 and 32, as further described in step 104. Targets or entities 34 in each of the sweeps 30 and 32 are therefore associated with polar coordinates(r,θ) and a return intensity level.

In step 102, a first level of data fusion occurs by using sensor data, such as range, azimuth angle, and return intensity, to gate and detect objects from the sweeps 30 and 32. The entities 34 are gated and paired for each detected object 36. In so doing the entities 34 may be averaged or combined using other methods known in the art, such that a single resulting target 38 is generated for each object 36. In one embodiment of the present invention the upramp objects are paired with the downramp objects such that they have similar return intensity and Doppler frequencies at a particular azimuth angle.

In step 104, range, range-rate, and direction of travel are determined for each resulting target 38 relative to the host vehicle 12. Range rate or relative velocity of an object may be determined in response to Doppler shift as known in the art.

Figure 3:
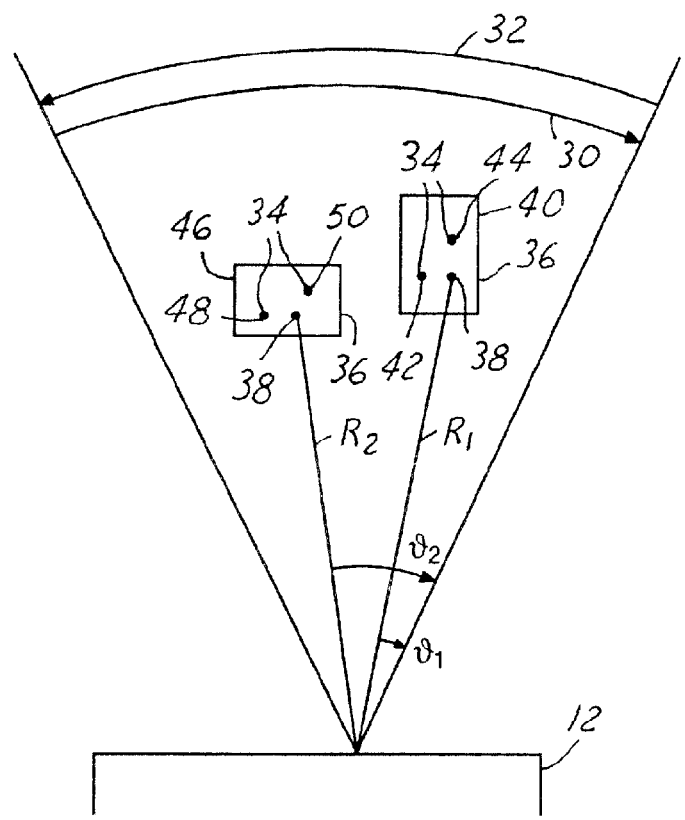
FIG. 3 is a sample of an electromagnetic sensor sweep plot illustrating range and azimuth angles of detected objects in accordance with an embodiment of the present invention.

FIG. 3 illustrates an example of steps 100–104. A first object 40 is shown having a first upramp target 42 and a first downramp target 44, along with a second object 46 having a second upramp target 48 and a second downramp target 50. The upramp targets 42 and 48 and the downramp targets 44 and 50 are gated and paired for each object 36 to form resulting targets 38, respectively. The resulting targets 38 have ranges $R_1$ and $R_2$ and azimuth angles $\theta_1$ and $\theta_2$, respectively.

Figure 4:
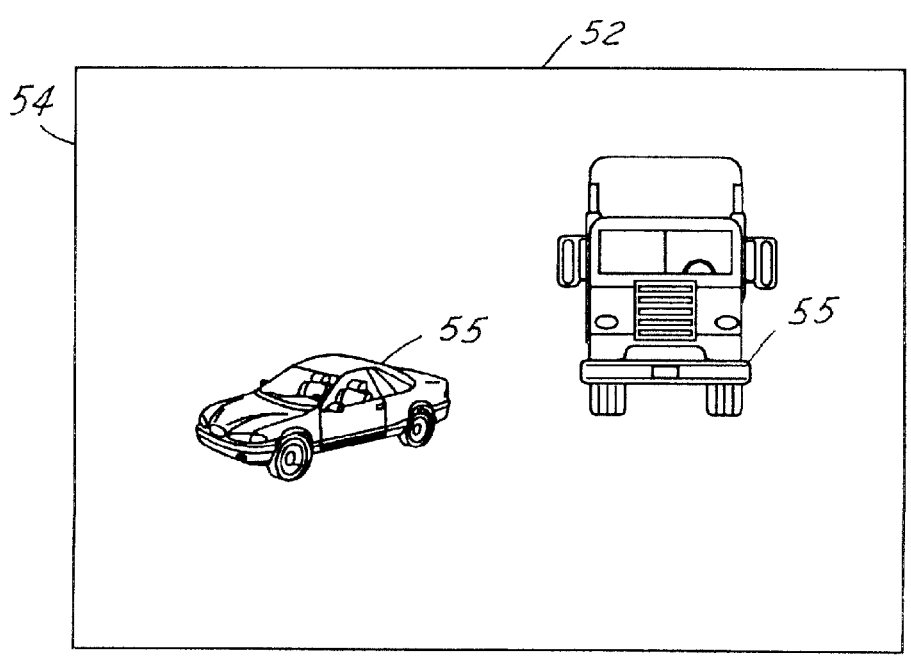
FIG. 4 is a sample image frame corresponding to the detected objects of FIG. 3 in accordance with an embodiment of the present invention.

Referring again to FIG. 2, in step 106, the image-generating unit 16 captures and stores image signals. Each image signal has an image frame 52, as best seen in FIG. 4, with a field-of-view 54 and including images or image of targets 55, corresponding to the objects 36 that were detected in step 100.

In the following Figures including FIG. 4, objects, regions-of-interest (ROIs), blocks, etc. are enlarged and are not to scale for description and understanding purposes, all of which in actuality may be respectively smaller and vary relatively in size.

In step 108, centers-of-reflection 56 are determined in response to each of the object detection signals.

In step 108A, the polar coordinates for each target 38 are transformed into a world coordinate system. The coordinates for each target 38 correspond to the center-of-reflection 56 representing centers of objects within an electro-magnetic sensor field. For example, the first range $R_1$ and the first azimuth angle $\theta_1$ for the first object 40 is converted into World coordinates ($X1_W$, $Y1_W$, and $Z1_W$).

Figure 5:
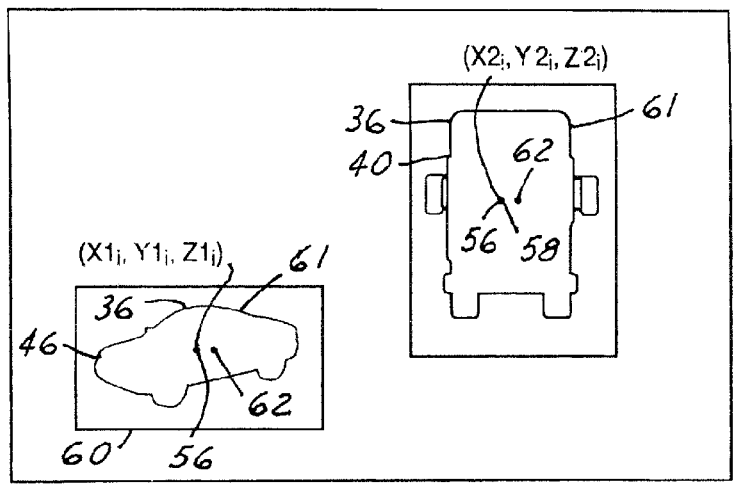
FIG. 5 is a sample of an image frame with perspective transform, illustrating sample regions-of-interest, centers-of-reflection, and centers-of-intensity in accordance with an embodiment of the present invention.

In step 108B, perspective transformation is performed on each of the World coordinates of each target 38, which results in transferring the centers-of-reflection 56 from the World coordinate system into an image coordinates system. For example, for the first object 40, Cartesian coordinates $X1_W$, $Y1_W$, and $Z1_W$ are converted in to corresponding image coordinates $X1_i$, $Y1_i$. The image coordinates for each target 38 are effectively overlaid on the image frame 52, as best seen in FIG. 5. The image coordinates $X1_i$, $Y1_i$ represent a center-of-reflection 58 for the first object 40.

In step 108C, an initial difference parameter $d_0$ is determined for each of the objects 36. The initial value of the difference parameter $d_0$ is an approximate number. The value of parameter $d_0$ is proportional to the velocity and range of an object relative to the host vehicle 12 and is also proportional to an average parameter $d_{avg}$ and is adjusted for any associated errors. The average difference parameter $d_{avg}$, which is part of the sensor difference signal and is generated in response to a set of difference parameters $d_i$, the centers-of-reflection 56, and centers-of-intensity 59. The centers-of-intensity 59 are intensity averaged center designators for objects in each ROI 60, as described below. Average parameter $d_{avg}$ is equal to zero for a first time period and accounts for errors between the centers-of-reflection 56 and the associated centers-of-intensity 59 for each object 36. Average parameter $d_{avg}$ is determined using difference vectors obtained from previous data, for example using radar frame 1 and image frame 1-15. The average parameter $d_{avg}$ is also modified by velocity and size of an object as detected in an image frame. An approximate circle or range is formed around the centers-of-reflection 56 having a radius d.

In step 110, the ROIs 60 are defined around each of the centers-of-reflection 56 for each object 36. The size of the ROIs 60 are determined in response to apriori data. The ROIs 60 may be of varying size and shape. The present invention uses the electro-magnetic sensors 14 to provide a starting reference point, such as each centers-of-reflection 56, in an image plane for each detected object. The ROIs 60 are generated around the centers-of-reflection 56. The size of each initial ROI 60 is determined in response to apriori data. For example, in one embodiment of the present invention height and width of the initial ROI 60 corresponds with height and width of a large manufactured vehicle. The apriori data may also include object velocity and range relative to the host vehicle 12. Object dimensions may be converted into a number of pixels in X and Y directions of an image plane and used in conjunction with object range from the host vehicle 12 to compute size of the initial ROI 60. In general, the larger the relative range of an object from the vehicle 12 the smaller the ROI.

Figure 7A:
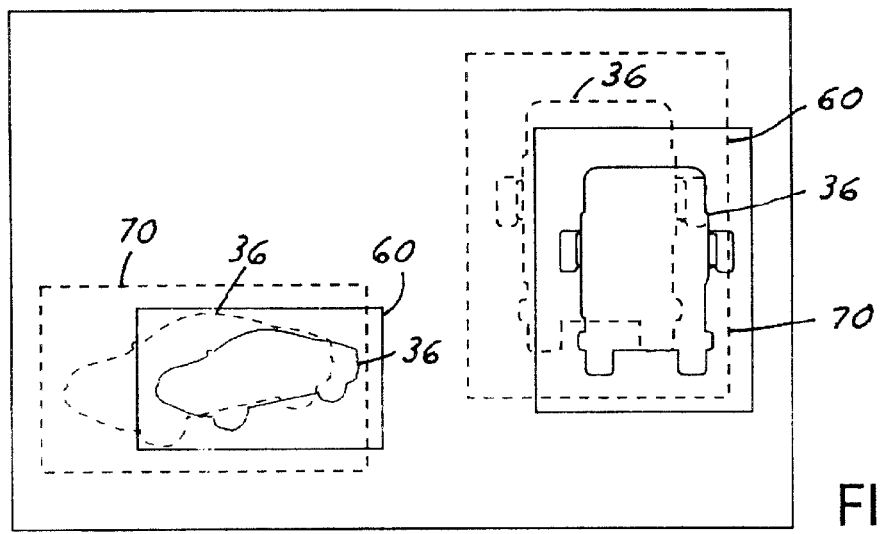
Figure 7B:
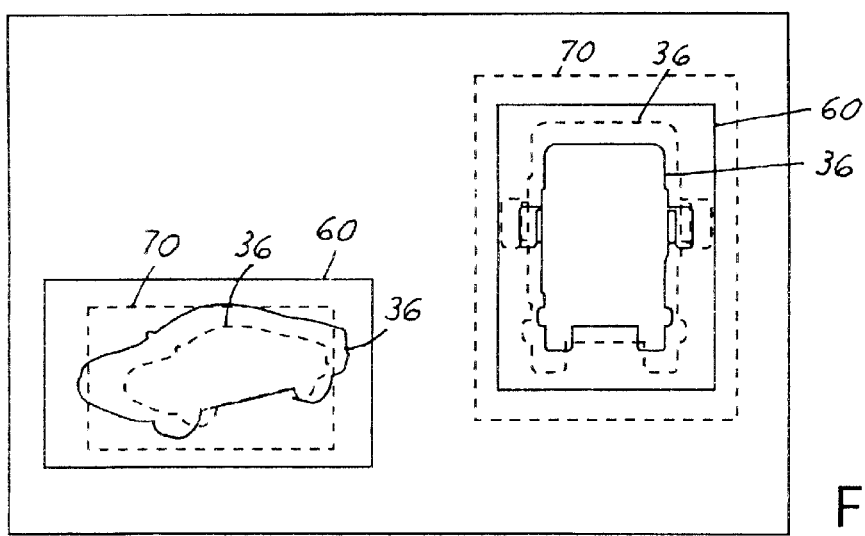
FIG. 7B is a sample image frame illustrating predicted regions-of-interest for objects moving away from the host vehicle in accordance with an embodiment of the present invention.

For a next or subsequent set of image frames, the corresponding size of the ROIs 60 is adjusted in response to speed and direction of travel of the detected objects 36 with respect to the host vehicle 12, as illustrated in FIGS. 7A and 7B by predicted ROIs 70 for detected objects 36. FIG. 7A is an example illustration of the objects 36 moving away from the vehicle 12 and FIG. 7B is an example of the objects 36 becoming closer to the vehicle 12. The size of the ROIs increases when the detected object 36 are becoming closer to the host vehicle 12 and decreases when the detected objects are moving away from the host vehicle 12. As the detected objects 36 are becoming closer to the host vehicle 12 their corresponding image increases in size and vice versa when the detected objects 36 are moving away from the host vehicle 12. The rate at which the ROIs 60 increase or decrease also depends on the speed of the detected objects 36 relative to the host vehicle 12.

In step 112, a centroid 62, as seen in FIG. 5, is determined for each object 40 corresponding to the centers-of-intensity 55. The controller 18 may use imageprocessing techniques, such as image filtering (low, high pass), edge detection, segmentation, or other processing known in the art on the image frame 52, to detect an object in the ROIs 60. The centroids 62 are determined in response to contour, height, width, area, and pixel intensity of each object detected in the ROIs 60 or the centroid 62 may be determined by determining an average weighted center of pixel intensity for the object detected in ROIs 60.

Figure 6:
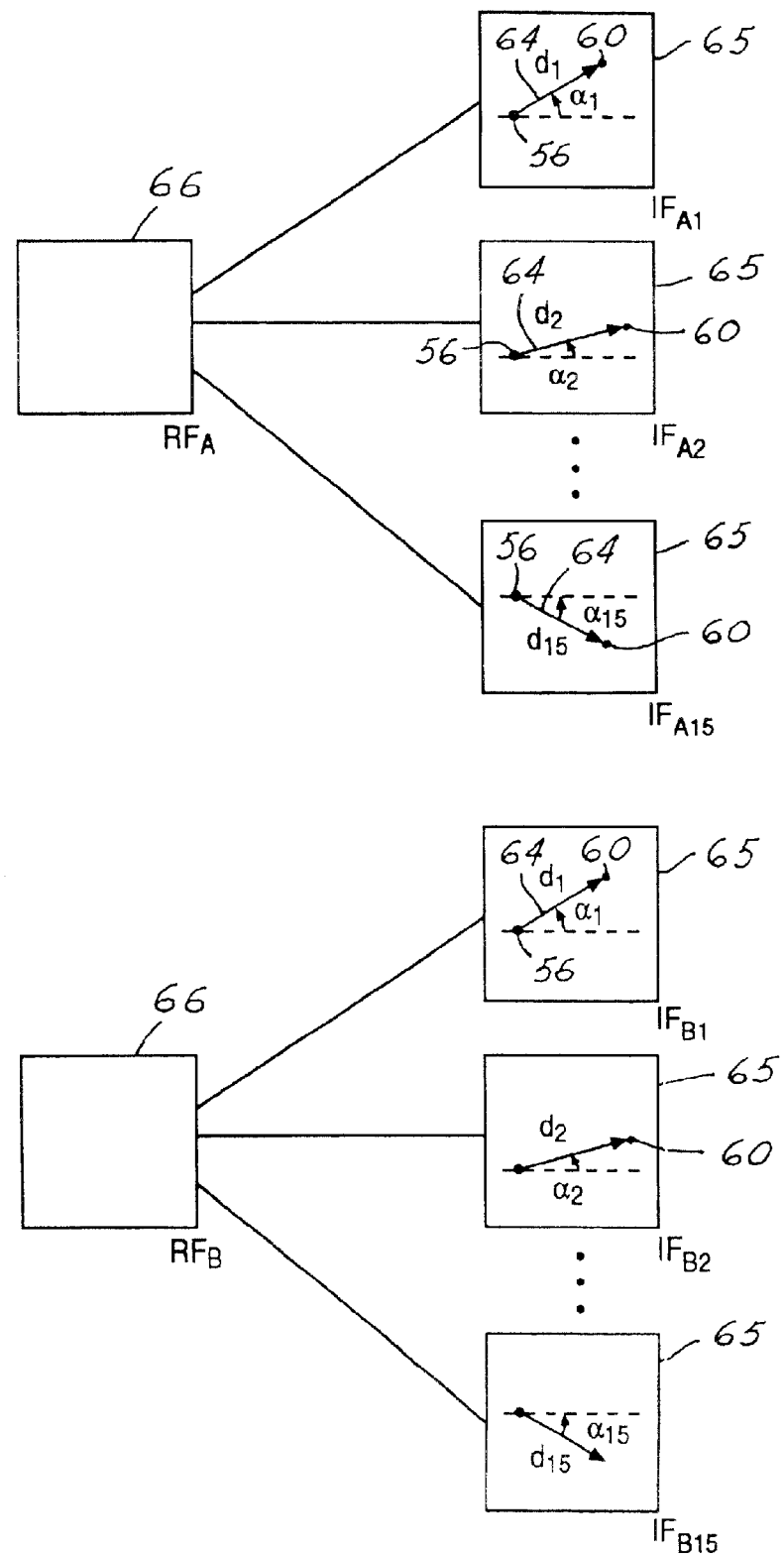
FIG. 6 is an image frame diagram illustrating sample radar frames and associated image frames in accordance with an embodiment of the present invention.

Referring now also to FIG. 6, in step 114, a set of vectors 64, represented by $d_1$–$d_{15}$, are determined between the centers-of-reflection 56 and the corresponding centroids 62, for image frames 65 and corresponding radar frames 66. Each vector 64 has an associated distance value or difference parameter $d_i$, where i is the vector number. The controller 18 determines the differences $d_i$ between the centers-of-reflection 56 and the corresponding centroids 62 for each image frame 65 as associated with a radar frame 66.

In step 116, the controller 18 compares the difference between each of the vectors 64 with the average parameter $d_{avg}$ to determine whether they are less than or equal to the average parameter $d_{avg}$.

In step 116A, when the vectors 64 are less than or equal to the average parameter $d_{avg}$ then the object in the corresponding radar frame is the same as an object detected in a corresponding image frame. In so doing, the present invention provides improved gating of associated objects targets in two dissimilar modalities or dissimilar sensors. Average parameter $d_{avg}$ is also used in determining an initial value difference parameter $d_0$ for the next sequential set of radar frames and corresponding image frame.

In step 116B, when a difference parameter $d_i$ is greater than the average parameter $d_{avg}$ than that difference parameter $d_i$ is discarded. In one embodiment of the present invention, sensor data is aligned and associated from two dissimilar sensors having different scan rates. In one embodiment of the present invention, the electro-magnetic sensors 14 have a scan rate of approximately two frames per second and the electro-optical sensor 16 has a scan rate of approximately 30 frames per second. To align and associate data from sensors 14 and 16 image frames 65 are associated with each radar frame 66. Thus, the set of vectors 64 for a first radar frame $RF_A$ has 15 associated image frames $IF_{A1}$–$IF_{A15}$.

In step 118, the controller 18 determines difference parameters $d_i$ between the center-of-reflection and the centroid obtained for the fifteen radar frames relative to the first image frame. Once all the difference parameters $d_i$ have been determined then an average difference parameter value $d_{avg}$ is determined in response to the difference parameters $d_i$ and is used as apriori information for computation of difference parameters $d_i$ for a subsequent set of radar frames. Steps 101–118 are repeated for each detected object until the detected object is no longer in close proximity of the host vehicle 12 i.e. all the difference parameters $d_i$ are greater than the initial distance $d_0$. In one embodiment of the present invention, an object is determined to be in close proximity when at least approximately 60% of the difference parameters $d_i$ are less than or equal to the initial difference $d_0$. As the percentage of difference parameters $d_i$ that are less than or equal to the initial difference $d_0$ increases the probability that the object is of concern increases and vice versa. In another embodiment of the present invention, when less than 60% of the difference parameters $d_i$ are less than or equal to the initial difference $d_0$ then the detected object is classified as a "ghost object" or a false object. When a ghost object or a false object is detected an error signal is generated and the controller 18 returns to step 100.

For example, when the current set of image frames is $IF_{A1-15}$, having corresponding radar frame $RF_A$, the next or subsequent set of image frames is $IF_{B1-15}$ and has corresponding radar frame $RF_B$. The subsequent set of image frames $IF_{B1-15}$ repeat the same procedure as performed for the current set of image frames $IF_{A1-15}$. Polar coordinates for the subsequent radar frame $RF_B$ of the detected object are determined followed by performing coordinate system transform and perspective transform to obtain new or subsequent image coordinates $IF_{B1-15}$ as stated in step 108.

In step 120, a subsequent set of ROIs are defined for each detected object. The new ROIs change between sequential image frames. The subsequent set of ROIs rather than being determined upon completion of step 118 may be determined in step 110. The subsequent set of ROIs may be determined, as described in step 110, by determining centers-of-intensity for each image frame with respect to a subsequent radar frame. When determining the subsequent set of ROIs, the average parameter $d_{avg}$ is determined from a previous set of ROIs to increase accuracy in determining whether a detected object is a potential threat to the host vehicle 12. The radar frame designator j is set equal to the current value of j plus one. When an error is detected the controller 18 may consider an object to be a false or ghost object and sets the radar frame designator j equal to one or performs some other task as known in the art.

In step 122, the detected real objects 36 may be classified and tracked in response to the sensor difference signal. The controller 18 may provide collision warning and countermeasure performance in response to object information including the object classification. Depending upon vehicle and object relative positions, velocities, and accelerations, the controller 18 may determine whether to indicate to a vehicle operator, via the indicator 26, of a potential collision, or may determine to perform a passive countermeasure or an active countermeasure. Upon completion of step 124 the controller 18 returns to step 101 when the value of the radar frame designator is greater than one to continue tracking the objects 36, otherwise the controller returns to step 100.

The above-described steps are meant to be an illustrative example; the steps may be performed sequentially, synchronously, or in a different order depending upon the application.

The present invention provides a collision warning and countermeasure system that utilizes object detection sensors in conjunction with image generating sensors to minimize and simplify image processing and more efficiently classify and track objects. The multiple sensor data fusion architecture of the present invention reduces amount of image processing by processing only selected areas of an image frame as determined in response to information from electromagnetic sensors.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of performing object detection within a collision warning and countermeasure system comprising:
   generating an object detection signal;
   generating an image detection signal;
   determining at least one center-of-reflection and at least one center-of-intensity in response to said object detection signal and said image detection signal;
   associating said at least one center-of-intensity with said at least one center-of-reflection;
   determining difference between said at least one center-of-reflection and said at least one center-of-intensity for a plurality of frames and generating a sensor difference signal; and
   classifying at least one object in response to said sensor difference signal.

2. A method as in claim 1 wherein generating an object detection signal comprises performing an upramp sweep and a downramp sweep.

3. A method as in claim 1 wherein generating an object detection signal comprises determining range and range-rate for at least one object.

4. A method as in claim 1 wherein generating an object detection signal comprises gating and pairing targets for at least one object.

5. A method as in claim 1 wherein generating an object detection signal comprises determining relative velocity and relative direction of travel for at least one paired target.

6. A method as in claim 1 wherein determining at least one center-of-reflection comprises transforming polar coordinates of said object detection signal into Cartesian coordinates.

7. A method as in claim 1 wherein determining at least one center-of-reflection comprises:
   performing a perspective transform of said world coordinates into image coordinates; and
   determining said at least one center-of-reflection in response to said image coordinates.

8. A method as in claim 1 further comprising determining at least one centroid in response to said at least one center-of-intensity.

9. A method as in claim 8 wherein determining at least one centroid comprises determining a current frame region-of-interest in response to a prior frame region-of-interest.

10. A method as in claim 8 wherein determining at least one centroid comprises adjusting size of a current frame region-of-interest in response to a prior frame region-of-interest and in response to said sensor difference signal.

11. A method as in claim 8 wherein determining at least one centroid comprises:
   determining whether an object is a false object or a ghost object and generating an error signal; and
   determining whether to use said sensor difference signal when determining a subsequent region-of-interest in response to said error signal.

12. A method as in claim 8 further comprising:
   determining a first set of vectors between said at least one center-of-reflection and said at least one centroid for a prior frame region-of-interest;
   determining a second set of vectors between said at least one center-of-reflection and at least one updated centroid for a current frame region-of-interest; and
   generating said sensor difference signal in response to said first set of vectors and said second set of vectors.

13. A method as in claim 12 wherein generating said sensor difference signal comprises averaging differences between said second set of vectors and said first set of vectors.

14. A method as in claim 1 wherein generating said sensor difference signal comprises accounting for errors between said at least one center-of-reflection and said at least one center-of-intensity.

15. A collision warning and countermeasure system for an automotive vehicle comprising:
   at least one object detection sensor generating an object detection signal;
   at least one image generating sensor generating an image detection signal; and
   a controller electrically coupled to said at least one object detection sensor and said at least one image generating sensor, said controller determining at least one center-of-reflection and at least one center-of-intensity in response to said object detection signal and said image detection signal, associating said at least one center-of-intensity with said at least one center-of-reflection, determining difference between said at least one center-of-reflection and said at least one center-of-intensity for a plurality of frames and generating a sensor difference signal, and classifying at least one object in response to said sensor difference signal.

16. A system as in claim 15 wherein said object detection sensor in generating said object detection signal performs an upramp sweep and a downramp sweep.

17. A system as in claim 15 wherein said controller in determining said at least one center-of-reflection gates and pairs targets generated from said radar sensor performing an upramp sweep and a downramp sweep.

18. A system as in claim 15 wherein said controller determines at least one centroid in response to said at least one center-of-intensity and determines a set of vectors between said at least one center-of reflection and said at least one centroid.

19. A system as in claim 18 wherein said controller compares differences between said set of vectors and an average distance parameter to determine an updated average distance parameter and determines a subsequent set of regions-of-interest in response to said updated average distance parameter.

20. A method of performing object detection within a collision warning and countermeasure system comprising:

generating an object detection signal by performing an upramp sweep and a downramp sweep;

generating an image detection signal;

determining at least one center-of-reflection and at least one center-of-intensity in response to said object detection signal and said image detection signal;

associating said at least one center-of-intensity with said at least one center-of-reflection;

determining difference between said at least one center-of-reflection and said at least one center-of-intensity for a plurality of frames and generating a sensor difference signal;

determining at least one centroid in response to said center-of-intensity;

determining a set of vectors between said at least one center-of-reflection and said at least one centroid;

comparing differences between said set of vectors and an average distance parameter to determine an updated average distance parameter;

determining a subsequent set of regions-of-interest in response to said updated average distance parameter;

determining updated centroids in response to said subsequent set of regions-of-interest; and classifying and tracking at least one object in response to said updated centroids.

* * * * *